(12) United States Patent
Moran et al.

(10) Patent No.: US 7,035,213 B2
(45) Date of Patent: Apr. 25, 2006

(54) METHOD AND PACKET SWITCHED COMMUNICATION NETWORK WITH ENHANCED SESSION ESTABLISHMENT

(75) Inventors: Timothy L. Moran, Corinth, TX (US);
Markus Isomäki, Espoo (FI);
Sreenivas Addagatla, Irving, TX (US);
Kaiser Chen, Irving, TX (US);
Shavantha Kularatna, Flower Mound, TX (US); Basavarai Patil, Coppell, TX (US)

(73) Assignee: Nokia Corporation, Espoo (FI)

( * ) Notice: Subject to any disclaimer, the term of this patent is extended or adjusted under 35 U.S.C. 154(b) by 147 days.

(21) Appl. No.: 10/283,236

(22) Filed: Oct. 30, 2002

(65) Prior Publication Data

US 2003/0103457 A1    Jun. 5, 2003

Related U.S. Application Data

(63) Continuation-in-part of application No. 09/983,152, filed on Oct. 23, 2001, now abandoned.

(51) Int. Cl.
*H04L 12/26* (2006.01)
*G06F 15/16* (2006.01)

(52) U.S. Cl. .................. 370/230; 370/395.2; 709/224; 709/227

(58) Field of Classification Search ............... 709/227, 709/228, 238, 223, 224, 230, 249; 370/389, 370/410, 261, 395.2, 351, 230, 231, 352, 370/395.1, 395.21, 395.5, 395.52, 401, 465, 370/466, 467, 235; 455/445, 450, 451, 452.1, 455/452.2
See application file for complete search history.

(56) References Cited

U.S. PATENT DOCUMENTS

5,021,949 A * 6/1991 Morten et al. ............... 709/231
6,038,212 A   3/2000 Galand et al.

(Continued)

FOREIGN PATENT DOCUMENTS

WO    WO 97/26729    7/1997
WO    WO 00/51306    8/2000

OTHER PUBLICATIONS

Bale, M.C.: "Voice and Internet Multimedia In UMTS Networks", BT Technology Journal, BT Laboratories, GB, vol. 19, No. 1, Jan. 1, 2001, pp. 48-66, XP001006580, ISSN: 1358-3948.

*Primary Examiner*—Alpus H. Hsu
(74) *Attorney, Agent, or Firm*—Squire, Sanders & Dempsey LLP

(57) ABSTRACT

The invention is a method of determining in at least one communication network if a session should be established in at least one communication network containing a plurality of session established entities, a method for determining if a session should be established with caller user equipment requesting the session, and in at least one communication network, a method for determining if a session should be established from caller user equipment at at least one communication network. A method of determining in at least one communication network if a session should be established in accordance with the invention includes processing a request from caller user equipment (114') to establish a session with callee user equipment (114) in the at least one communication network (102 and 104) with a session establishment entity (108, 110, 112 and 114) to determine if at least a portion of the request (140 and 142) exceeds a size limit and establishing the session (146) if at least the portion of the request is determined by the session establishment entity to not exceed the size limit.

53 Claims, 14 Drawing Sheets

U.S. PATENT DOCUMENTS

| | | | |
|---|---|---|---|
| 6,202,096 B1 * | 3/2001 | Williams et al. | 709/230 |
| 6,366,577 B1 * | 4/2002 | Donovan | 370/352 |
| 6,412,007 B1 * | 6/2002 | Bui et al. | 709/227 |
| 6,442,608 B1 * | 8/2002 | Knight et al. | 709/225 |
| 6,571,287 B1 * | 5/2003 | Knight et al. | 709/225 |
| 6,601,099 B1 * | 7/2003 | Corneliussen | 709/224 |
| 6,636,596 B1 * | 10/2003 | Gallant et al. | 379/220.01 |
| 6,754,230 B1 * | 6/2004 | Purpura et al. | 370/468 |
| 6,865,681 B1 * | 3/2005 | Nuutinen | 713/201 |
| 2001/0026553 A1 * | 10/2001 | Gallant et al. | 370/395 |

* cited by examiner

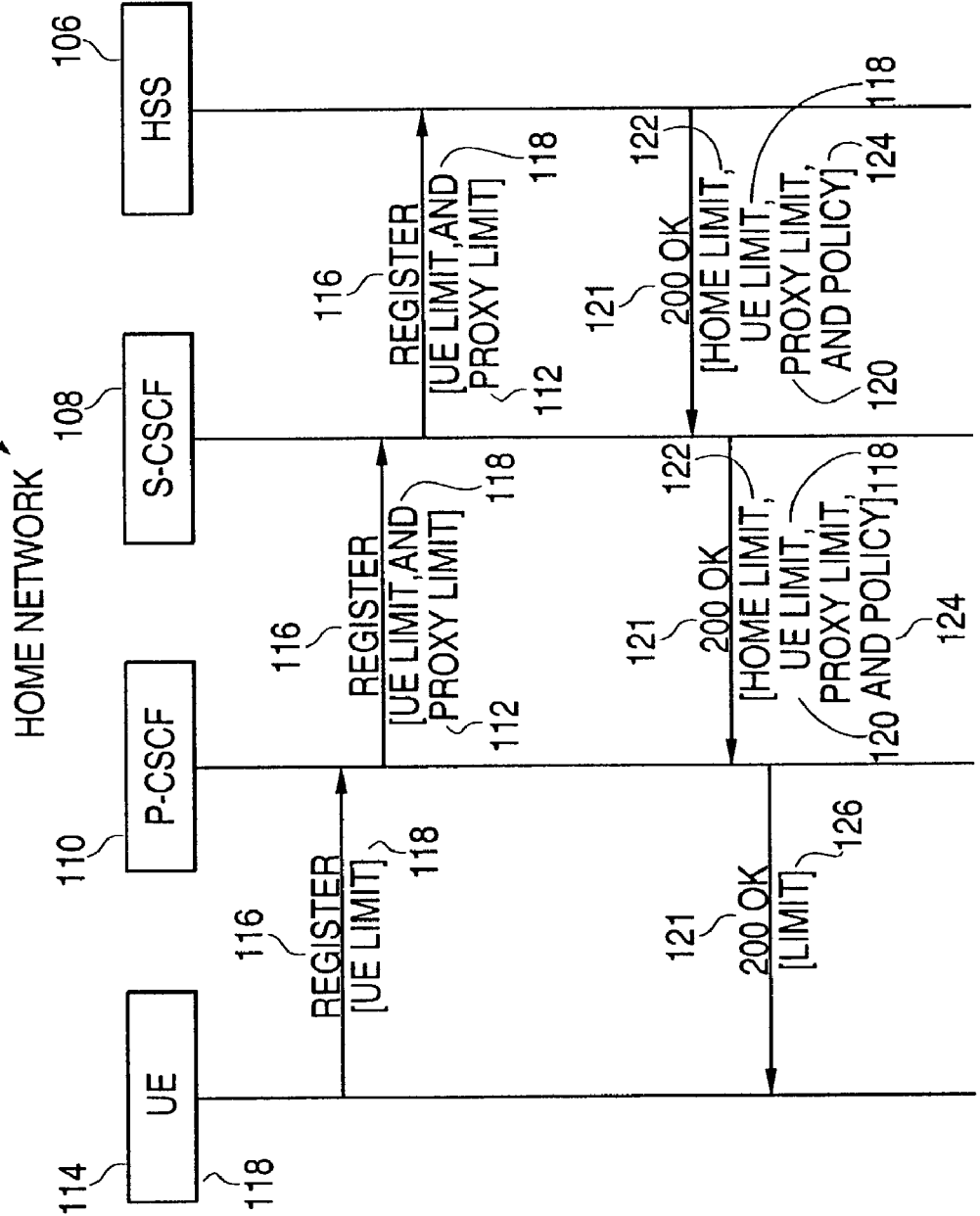

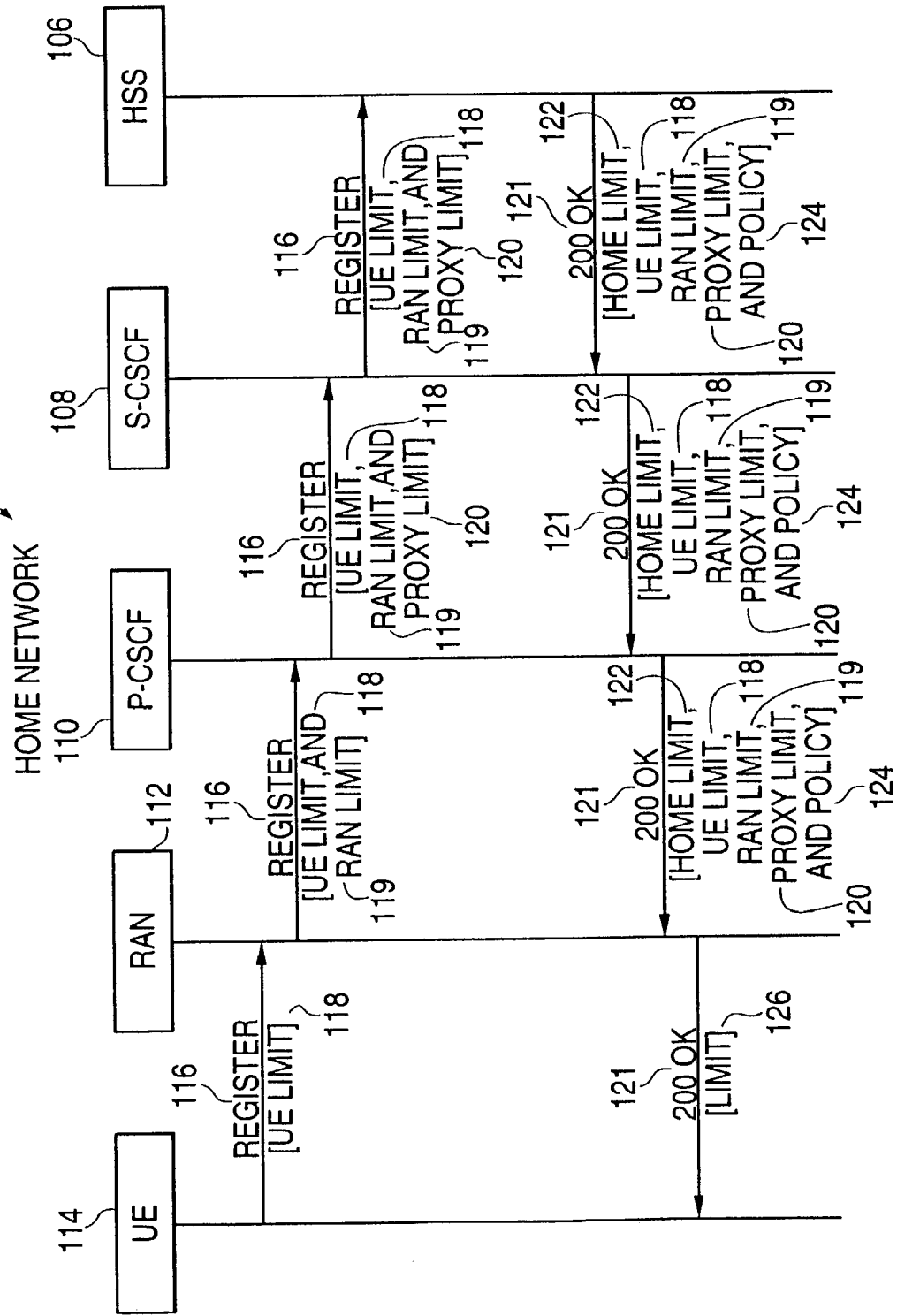

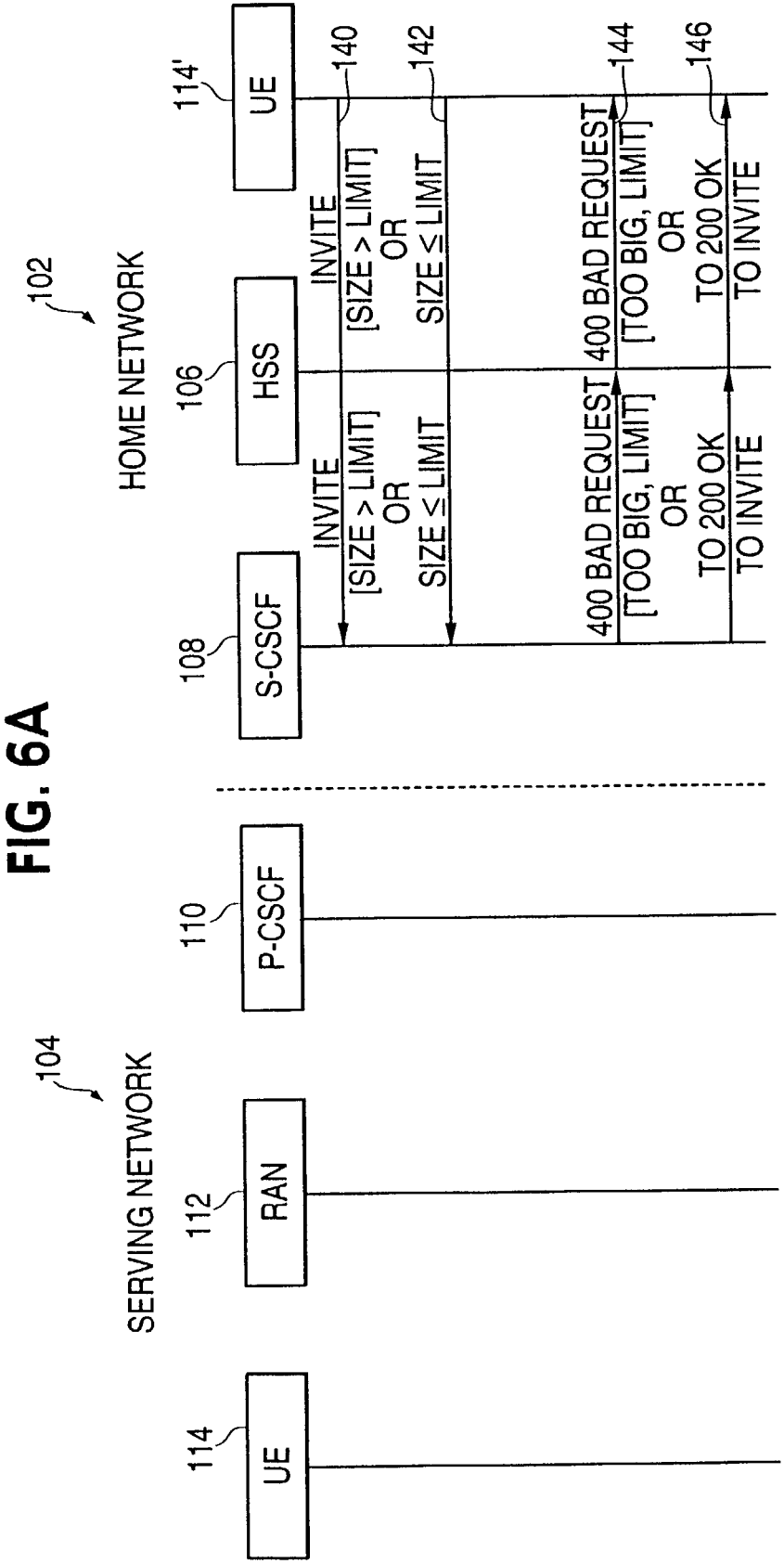

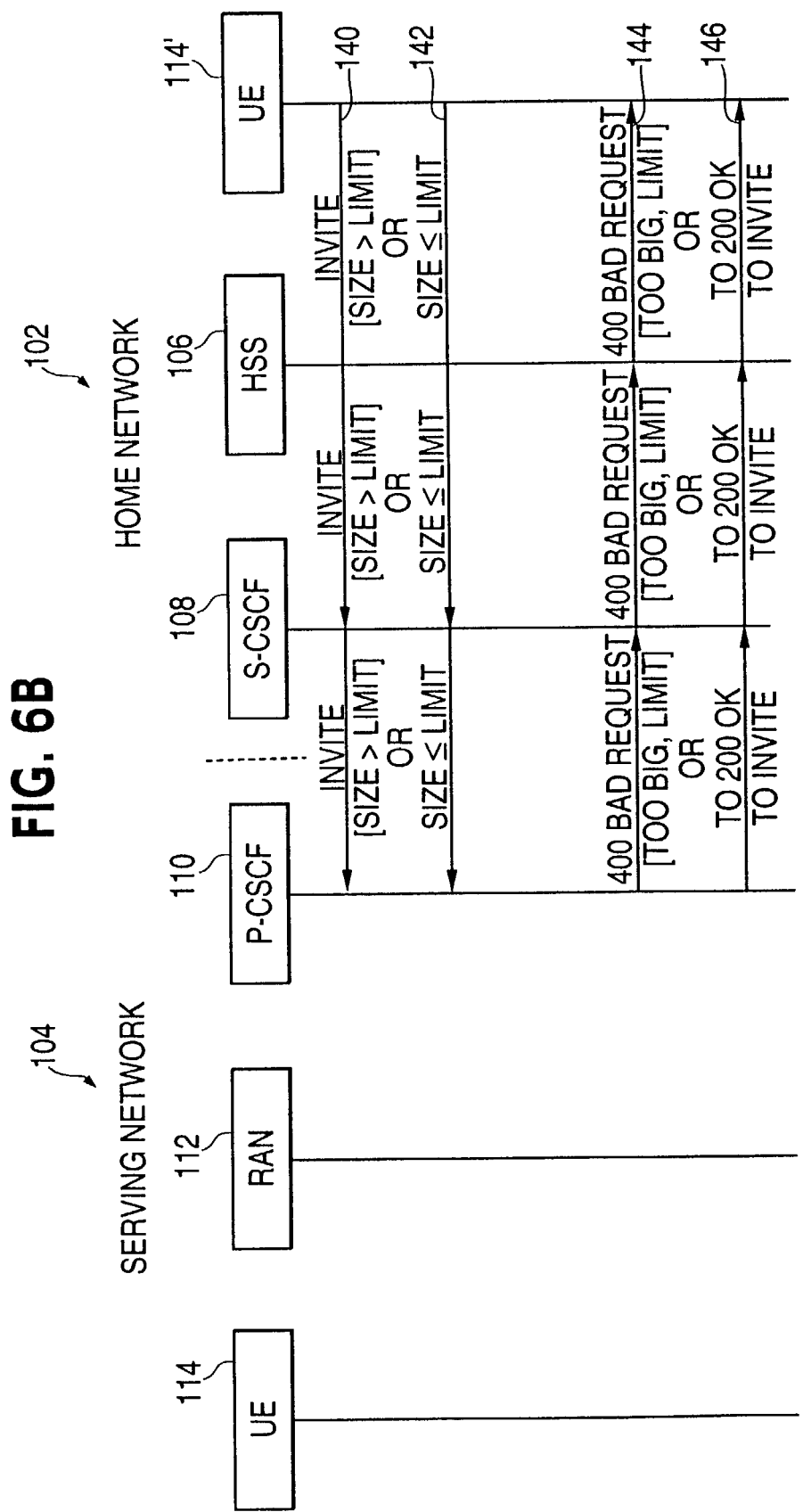

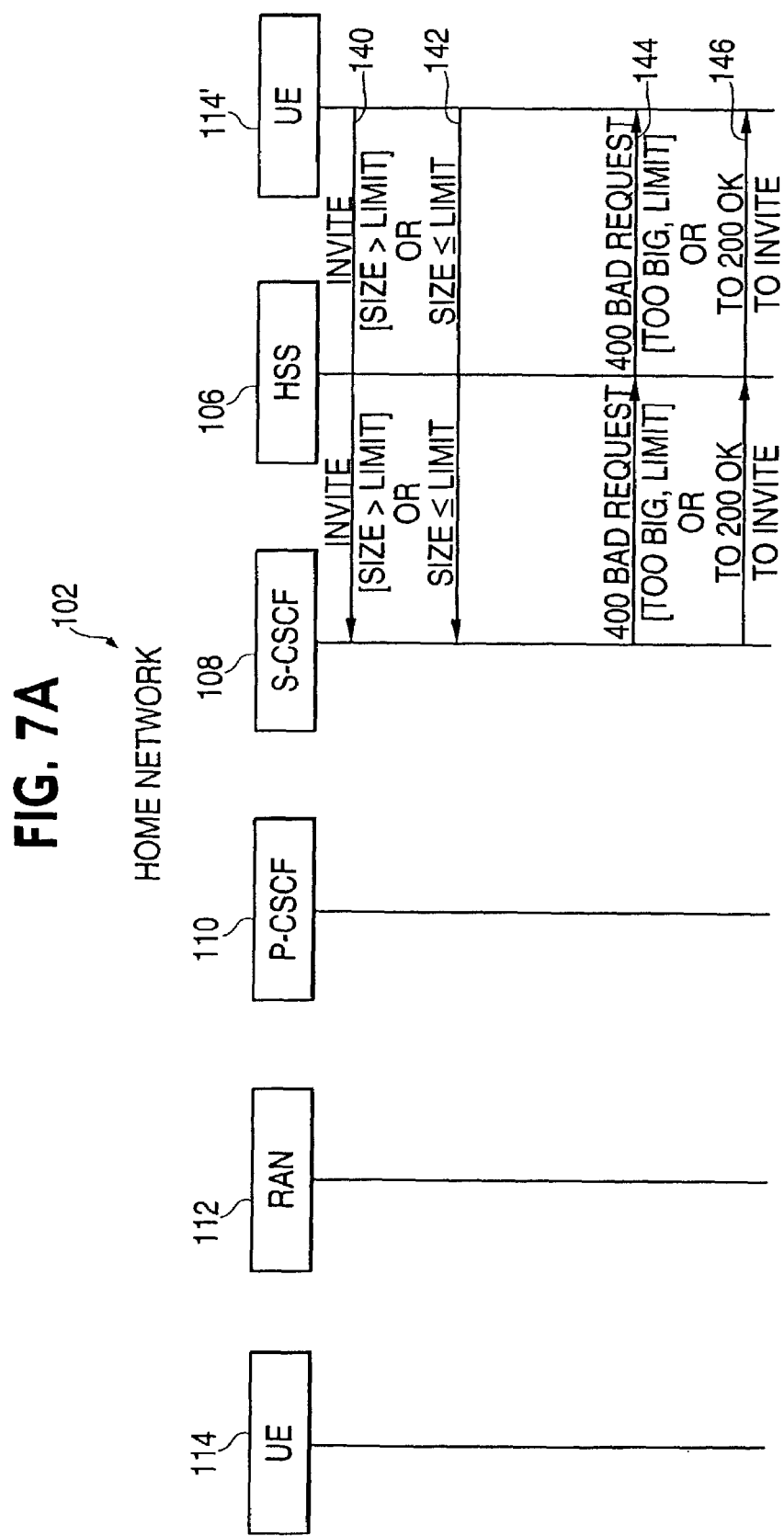

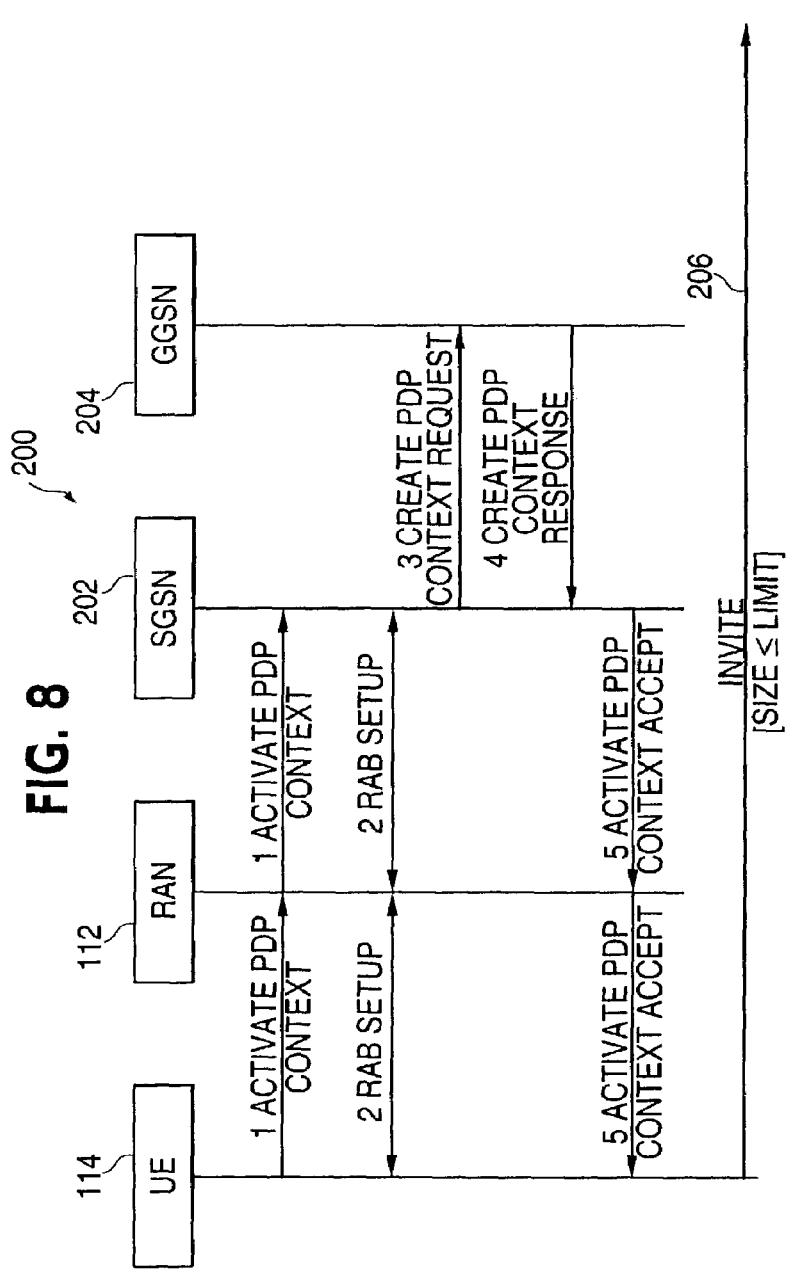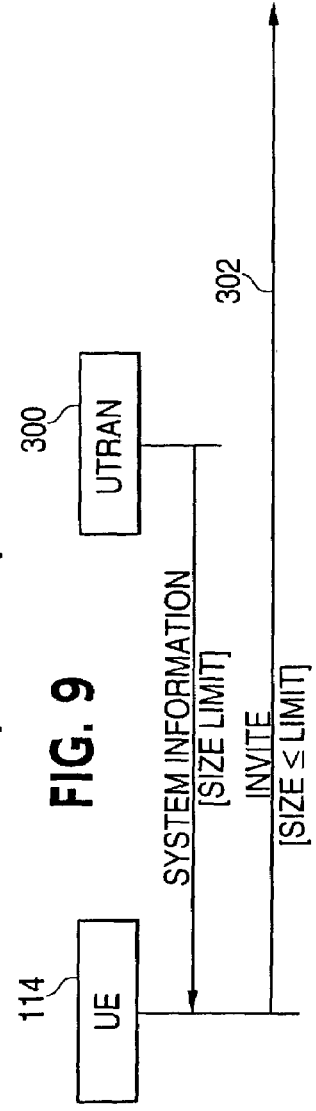

METHOD AND PACKET SWITCHED COMMUNICATION NETWORK WITH ENHANCED SESSION ESTABLISHMENT

CROSS REFERENCE TO RELATED APPLICATION

This application is a continuation-in-part of U.S. patent application Ser. No. 09/983,152, filed Oct. 23, 2001 now abandoned entitled "Method and Packet Switched Communication Network with Enhanced Session Establishment" which application is incorporated herein by reference in its entirety.

BACKGROUND OF THE INVENTION

1. Field of the Invention

The present invention relates to networks and methods for increasing the speed of and enhancing session establishment.

2. Description of the Prior Art

The Technical Specification 3GPP TS 23.228 V5.O.0 (2001–04) sets forth a mechanism for providing multimedia services in packet switched communication networks. The Technical Specification is incorporated herein by reference in its entirety.

The 3GPP R5 defines Session Initiation Protocol (SIP) protocol for session establishment and control. The SIP protocol was designed with wired networks in mind and powerful clients capable of doing end to end service negotiation. Wired networks have ample bandwidths local area networks (LANs) and clients with substantial processing capability, memory and power.

Third generation Internet Protocol (IP) networks require optional use of resources such as radio frequency bandwidth and battery life. The more than sufficient bandwidth and battery capacity of wired networks does not apply to wireless networks. IP protocols such as SIP are desirably optimized to efficiently use wireless networks and terminals.

Packet switched communication networks in accordance with the aforementioned 3GPP Technical Specification, while robust in providing services utilizing the session initiation protocol (SIP), suffer from a slowed session establishment when communications during session establishment involve low speed communications such as low capacity access networks. An example of this occurs when user equipment (UE) of a caller in a robust packet switched communication network wishes to establish a session with UE of a callee in a lower capacity access or service network containing a large capacity payload transmitted by the UE of the caller. The large capacity payload slows down the session establishment with the callee in the lower capacity access or service network as a consequence of the lower capacity slower communications therein. Currently, there is no technique for enhancing the speed of session establishment when large data payloads are involved during session establishment, especially when the UE of the callee is in a lower capacity slower access network.

WO 26729 discloses providing information about an end user/terminal capabilities to the sender so that the sender may refrain from sending a wrong type, such as too large of a data file, during transmission.

The SIP RFC discloses that a terminal may place a URL in a SIP transmission instead of payload.

WO 00/51306 discloses a network which may replace a payload with a URL.

WO 27537 discloses the storing and forwarding of payloads using the SIP INFO messages.

3GPP Rel 5 and 6, which are incorporated herein by reference in their entirety, have chosen SIP as the call control protocol. SIP will be implemented in mobile devices and core network switches. Prior to SIP being chosen as the call control protocol, 3GPP R4 and 3GPP UMTS release 99, which are incorporated herein by reference in their entirety, used an enhanced version of the 2G Call Control protocol (Typically mentioned as 3G-CC).

SIP and 3G-CC have different characteristics. 3G-CC is binary protocol with a very strict definition of the messages. Typical 3G-CC messages are optimized for the wireless environment. Hence 3G-CC messages are much smaller in size (less than 40 octets per message in a majority of the cases). On the other hand, SIP is an ASCII protocol defined by the Internet Emergency Task Force (IETF). Hence, SIP is very flexible with loosely defined messages. While SIP messages are well suited for current (IP) wireline applications, SIP requires additional functions, such as compression and filtering of messages, before effective use in the wireless environment can be realized.

Even though Universal Mobile Telecommunications System (UMTS) R99 operates on a large carrier (3.84 MHz) w.r.t. 2G-GSM (200 KHz), it is typically shared with many users resulting in smaller signaling data rates per user. This signaling bandwidth is even more restricted in the GSM/EDGE Radio Access Network (GERAN) release in view of much narrower signaling channels. Studies have shown that even with compression techniques, SIP messages are quite large in size and require a significant number of bytes to complete a voice call. For example, only 75 octets of data are required to complete a GSM call, while a SIP call with compression requires 1200 octets. See SIP compression, 3GPP TSG GERAN, Tdoc GP-011198 which is incorporated herein by reference in its entirety.

It is expected that SIP users will not willingly pay for large signaling messages that are required to establish the user plane. This is also the case in 2G wireless where signaling messages are transported via common channels free of charge. Hence, the flexibility of SIP signaling messages can be abused by users to obtain free service.

Since SIP messages are ASCII, they are much more flexible regarding header requirements. Also, the size of a SIP message cannot be determined to an accuracy of one octet. A good example is the SIP INVITE request and the response message 180 (Ringing). A SIP INVITE message uses a SIP Request line or the start line, Via, To, From, Call-ID, Cseq, Subject, Contact, Content-Type, Content-Length etc. Each of the headers thereof are followed with relevant data followed with a control character to indicate the end of line. With reasonable use, the subject header is very small. However, an abusive user can insert an unlimited amount of data (even a whole article) followed by a control character to indicate the end of line. The 180 Ringing response message is also an informational message. The start line of a 180 Ringing response begins with 'SIP/2.0 180 Ringing', with the word Ringing being the recommended response. A significant amount of text can be inserted after the "180" without violating the SIP specification. Hence two users may be able to communicate their own messages via SIP message structures without charge.

These kind of abuses pose several problems:

a) The precious wireless medium is consumed blocking other legitimate users.

b) Increased interference can occur causing network wide capacity reductions.

c) Difficult engineering of the wireless links is the result.

d) Increased cost for other applications can occur where operators want to recover lost revenue.

SUMMARY OF THE INVENTION

The present invention is a method and at least one network which enhances session establishment. The enhancement may increase the speed of session establishment and/or prevent unauthorized use of session establishment to transport data to prevent loss of revenue to network operators. A session establishment entity processes the size of a request for session establishment to determine if a size limit, which may be set by different policy criteria in at least one network, is exceeded.

In a first embodiment the speed of session establishment is increased. An increase in the speed of session establishment is produced by reducing the information content (data payload) transmitted from a session establishment entity, such as, but not limited to, by processing performed by a call state control function (CSCF) or a proxy call state control function (PCSCF). The reduction in data payload enhances the speed of transmission of the request which increases the speed of completing processing of the request. The removed information is at least some and preferably all information which is not necessary for session establishment.

Regarding the first embodiment, slowing of session establishment is descriptive of an unacceptable time required for completing session establishment caused by the data payload transmitted from the caller UE to the callee UE associated with the session establishment. The actual size of the data payload causing unacceptable slow down varies in proportion to the network throughput (bandwidth) between the caller UE and the callee UE. The slower the data connection is between the caller UE and the callee UE, the smaller the size of data payload which causes the unacceptable slowdown. The relative speed of session establishment, which is unacceptably slow, triggering removal of data from the payload, may be determined either by user requirements (e.g. the speed at which the caller and/or the callee considers completion of call set up to be acceptable) or from network parameters (e.g. call set up must be completed within a specified time).

With regard to the first embodiment, the session establishment control entity processes information to be transmitted from the caller UE to the callee UE during session establishment to produce session establishment information having a smaller payload than the original information by removing from the original information to be transmitted from the caller UE to the callee UE an amount of information which would slow the session establishment if transmitted to the callee UE during session establishment. Thereafter, at an entity in at least one communication network, which may be a packet switched communication network and may be a separate server, the removed information is stored for later transmission to the callee UE after session establishment is completed. Thereafter, the session establishment information, which has less content and payload than the original information, is transmitted by the caller UE to the callee UE, which is processed by the callee UE, to complete session establishment.

The aforementioned server or other storage of the removed information is addressable in at least one communication network. The address of storage of the removed information in the at least one communication network may be included in the session establishment information transmitted to the callee UE. Alternatively, the removed information may be automatically forwarded to the callee UE after session establishment is completed from the storage in the at least one communication network under control of the session establishment entity. The transmission from the caller UE to the callee UE during session establishment may without limitation use the SIP INVITE message and the later transmission of the removed information may without limitation use the SIP INFO message. The callee UE may send a transmission, after session establishment is completed, to the address where the removed information is stored in the at least one communication network which then transmits the removed information to the callee UE. Either methodology of transmitting the removed information to the callee UE avoids session establishment delay in view of the transmission being completed outside of the time interval during which session establishment occurs. The callee UE may be within another network, such as a packet switched data network, lower capacity access network, or service network having a lower data transmission capacity than the packet switched data network, but the invention is not limited thereto.

In a second embodiment of the invention, requests to establish a session from caller user equipment to callee user equipment are provided to a session establishment entity, which may be in a home or serving network and may without limitation be the callee user equipment, the radio access network (RAN), call state control function entities (e.g. P-CSCFN or S-CSCF) or a HSS, to determine if the request to establish a session has an unacceptably large payload which exceeds a size limit. If the request to establish a session is determined to not exceed the size limit, the session establishment entity signals that the request to establish the session is acceptable and the session establishment is completed. If, on the other hand, the request to establish a session is determined by the session establishment entity to exceed the size limit, the session establishment entity signals that the session is unacceptable.

The processing of requests to establish a session to determine if a size limit is exceeded provides a solution to unauthorized and unacceptable usage of session establishment messages, such as without limitation the SIP INVITE message, to convey content without payment to a network operator(s). The determination of the size limit is exceeded is a filtering operation. The filtering of a total length of a SIP INVITE message to determine if the size limit is exceeded is exemplary of the invention.

The determination of the size limit may be performed by at least one session establishment entity in at least one network such as without limitation a home network and/or a serving network which may be a packet switched data network. The session establishment entities may be, without limitation, callee user equipment, a RAN, call state control function entities and a HSS. The determining of the size limit may be performed by each session establishment entity which participates in the determination by passing its size limit on to the HSS or another server which processes the individual size limits which are transmitted from each session establishment entity to identify the smallest size limit which is used to process a request to establish a session with mobile callee user equipment. The HSS, another server, or one of the session establishment entitles determines policy which is transmitted back to at least one of the session establishment entities which performs the actual processing of the request to establish a session to determine if the request exceeds the size limit. The policy may contain additional information beyond the smallest size limit which has been determined from processing all of the size limits received from the session establishment entities such as time variation of the size limit so that different size limits are applied at different times of the day and/or different session control entities are assigned dynamically to processing requests for a session.

In a third embodiment of the invention, the caller user equipment communicates with at least one network to obtain a size limit to be used to determine if any request to establish a session by the user equipment does not exceed a size limit. Establishment of a session is originated from the caller user equipment when the session does not exceed the size limit.

A method of determining in at least one communication network if a session should be established in accordance with the invention includes processing a request from caller user equipment to establish a session with callee user equipment in the at least one communication network with a session establishment entity to determine if at least a portion of the request exceeds a size limit; and establishing the session if at least the portion of the request is determined by the session establishment entity to not exceed the size limit. When the request is determined to be beyond the size limit, the session establishment entity may reject the request and a message of the rejection may be transmitted back to the caller user equipment or at least a portion of the request may be processed by the session establishment control entity to remove from the at least a portion of the request information in the request beyond the size limit; the removed information may be stored, and the stored removed information may be transmitted to the callee user equipment after completion of session establishment. The size limit may be determined by at least one of a home subscriber server, a call state control function entity, a radio access network and the callee user equipment. The call state control function entity may be one of a proxy call state control function in a serving network and a serving call state control function in a home network. The session establishment entity which determines if at least a portion of the request exceeds the size limit may be at least one of a home subscriber server, a call state control function entity and the callee user equipment which stores the smallest size limit. The at least one communication network may comprise a home network; and the callee user equipment may be registered in the home network at a time the request to establish a session is received from the caller user equipment. The at least one communication network may comprise a home network and a serving network and the callee user equipment may be registered in the home network at a time the request to establish a session is received from the caller user equipment. The callee user equipment may be registered in the home network at a time the request is received from the caller user equipment. The removed information may be stored at a server in the at least one communication network. The callee user equipment may be in a serving network and the session establishment entity may be in a home network with the serving network having a lower data transmission capacity than the home network. The home network may be a packet switched network. The processing of the request by the session establishment entity may comprise filtering the request to determine if at least the portion of the request exceeds the size limit.

In at least one communication network containing a plurality of session establishment entities, a method for determining if a session should be established with caller user equipment requesting the session in accordance with the invention includes registering callee user equipment with a home subscriber server in a home network by transmitting a request to register the callee user equipment containing at least one size limit to the home subscriber server, with each size limit being associated with a different session establishment entity in the at least one communication network; determining a smallest size limit contained in the request to register; processing a request to establish a session with a session establishment entity to determine if the request to establish the session exceeds the smallest size limit; and establishing the session if the request is determined to not exceed the smallest size limit. When the request is determined to be beyond the smallest size limit, the session establishment entity may reject the request, and a message of the rejection may be transmitted back to the caller user equipment. When the request is determined to be beyond the smallest size limit, at least a portion of the request may be processed by the session establishment control entity to remove from at least a portion of the request information in the request beyond the smallest size limit; the removed information may be stored; and the stored removed information may be transmitted to the callee user equipment after completion of session establishment. The smallest size limit may be determined by at least one of a home subscriber server, a call state control function entity, a radio access network and the callee user equipment. The call state control function entity may be one of a proxy call state control function in a serving network and a serving call state control function in a home network. The session establishment entity which determines if the request exceeds the smallest size limit may be at least one of a home subscriber server, a call state control function entity and the callee user equipment which stores the smallest size limit. The at least one communication network may comprise a home network; and the callee user equipment may be registered in the home network at a time the request to establish a session is received from the caller user equipment. The at least one communication network may comprise a home network and a serving network and the callee user equipment may be registered in the home network at a time the request to establish a session is received from the caller user equipment.

In at least one communication network, a method for determining if a session should be established from user equipment in accordance with the invention includes during registration of the caller user equipment with one of the at least one communication network the caller user equipment communicates with the at least one network to obtain a size limit of any request to establish a session by the caller user equipment; the caller user equipment uses the size limit to determine if any request to establish a session to be provided by the caller user equipment does not exceed the size limit; and establishment of a session is requested from the caller user equipment when the session does not exceed the size limit. The registration may be with a packet data network or a radio access network.

At least one network in accordance with the invention includes caller user equipment; callee user equipment; a session establishment entity; and wherein the at least one network processes a request from the caller equipment to establish a session with the callee user equipment in the at least one communication network with the session establishment entity to determine if at least a portion exceeds a size limit and the session is established if at least a portion of the request is determined by the session establishment entity to not exceed the size limit.

At least one network in accordance with the invention includes a plurality of session establishment entities; caller user equipment; callee user equipment; and wherein callee user equipment is registered with a home subscriber server in a home network by transmitting a request to register the callee user equipment containing at least one size limit to the home subscriber server, with each size limit being associated with a different session establishment entity in the at least one communication network; a smallest size limit contained in the request is determined; a request to establish a session with a session establishment entity is processed to determine if the request to establish the session exceeds the smallest size limit; and the session is established if the request is determined to not exceed the smallest size limit.

At least one communication network in accordance with the invention includes caller user equipment; and wherein during registration of the caller user equipment with one of the at least one communication network the caller user equipment communicates with the at least one network to obtain a size limit of any request to establish a session by the caller user equipment; the caller user equipment uses the size limit to determine if any request to establish a session to be provided by the caller user equipment does not exceed the size limit; and the caller user equipment requesting establishment of a session when the session to be requested does not exceed the size limit.

BRIEF DESCRIPTION OF THE DRAWINGS

FIG. 4 illustrates a third method of determining a size limit used during establishing a session with callee user equipment located in a home network in accordance with the invention.

FIG. 5 illustrates a fourth method determining a size limit used during establishing a session with callee user equipment located in a home network in accordance with the invention.

FIGS. 6A–6D illustrate the processing of a request to establish a session by different session establishment entities with caller user equipment in a serving network.

FIGS. 7A–7D illustrate the processing of a request to establish a session by different session establishment entities with callee user equipment in a home network.

FIG. 8 illustrates the establishment of a size limit during registration to a packet data network to be used by caller user equipment in formulating a request for establishing a session by the caller user equipment with callee user equipment.

FIG. 9 illustrates the establishment of a size limit during registration with a RAN to be used by caller user equipment in formulating a request for establishing a session by the caller user equipment with callee user equipment.

Like parts are identified in the same manner throughout the drawings.

DESCRIPTION OF THE PREFERRED EMBODIMENT

Figure 1:
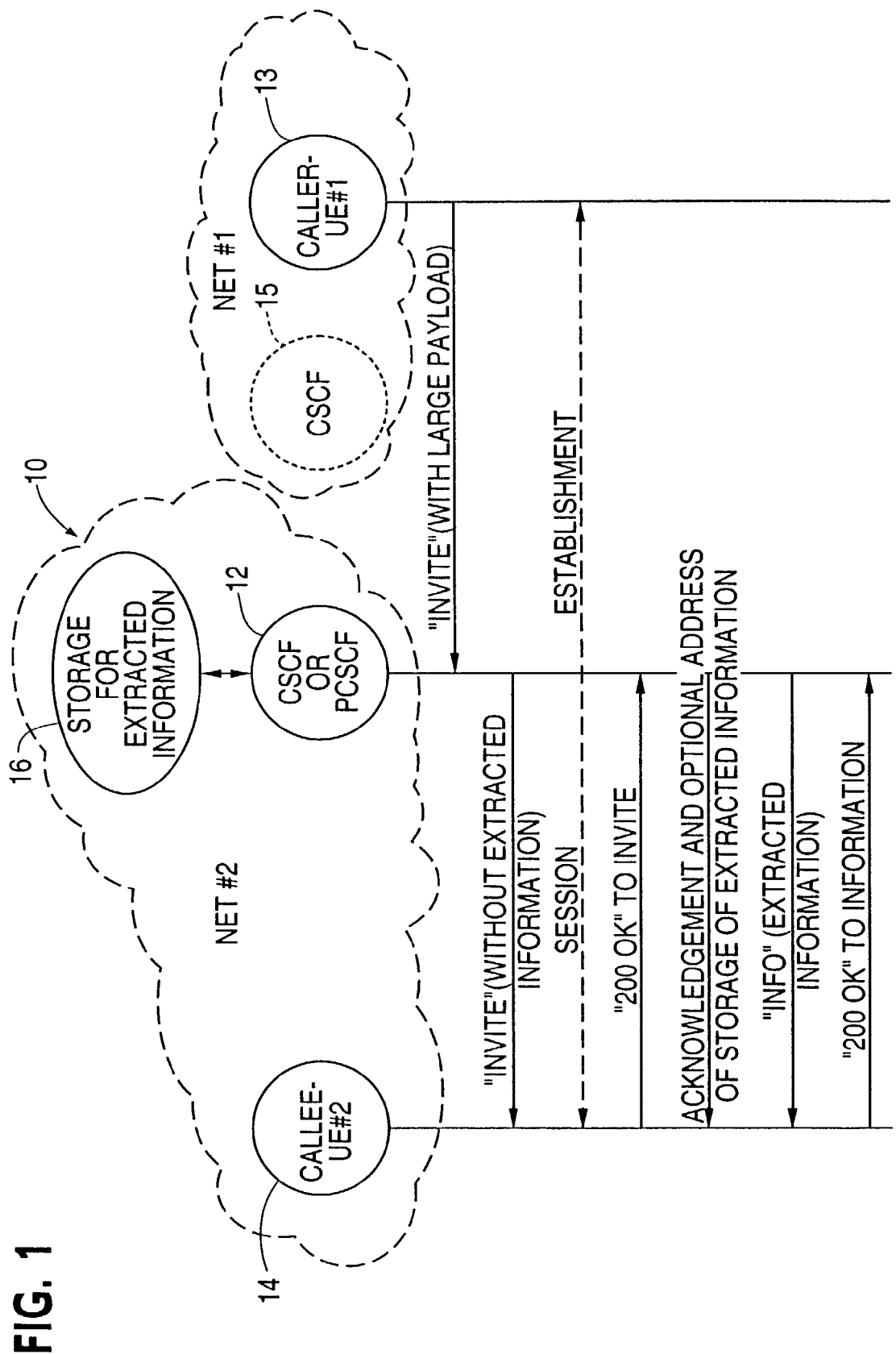
FIG. 1 illustrates a block diagram of the network and process in accordance with the present invention.

FIG. 1 illustrates a network and process in accordance with the present invention. The network(s) 10, which may include NET#1 and NET#2, include a network entity 12 which is a CSCF or PCSCF to which the UE#1 of a caller 13 transmits an INVITE with a large payload. The caller 13 of the UE#1 is desirous of setting up a session, such as a multimedia session involving a large data payload with UE#2 of a callee 14, which may be within a single packet switched communication network 10 or, alternatively, in another packet switched communication network such as NET#2. As illustrated, the first network NET#1 may be a high capacity high speed robust packet switched data network and the second network NET#2 may be a lower capacity, slower speed, and less robust network which has insufficient bandwidth to rapidly transport the large data payload involved with session establishment of the UE#1 of the caller 13, such as a slower speed packet switched data network, access network, or service network. The payload of UE#1 of the caller 13 is so large that session establishment between UE#1 and UE#2, whether in one network 10 or within two networks NET#1 and NET#2, is slowed to a degree that is undesirable or unacceptable from the standpoint of preferences of the caller 13 using UE#1 indicated in session setup information such as time limits for completing response establishment, network parameters setting time limits for completion of session establishment or callee preferences or capabilities which are stored in the network. If the caller and the callee are in the same network, the session establishment control entity may be a CSCF. Alternatively, if the UE#1 of the caller 13 and the UE#2 of the callee 14 are in a different network, the session establishment control entity in NET#2 may be a PCSCF with the CSCF being in network #1 as indicated by the dotted phantom circle CSCF 15.

An example of session establishment in at least one packet switched communication network in accordance with the invention is explained with reference to FIG. 1 using the SIP protocol communications, but it should be understood that the invention is not limited to the SIP protocol. The UE#1 of the caller 13 sends an INVITE message to the CSCF 15 or PCSCF 12 which contains a data payload which is sufficiently sizable that if the entire payload were transmitted from the caller 13 to the callee 14, session establishment would be unacceptably slowed from either or both of the caller's and callee's preferences or network parameters because of the size of the data transmission which would be required to be sent to the UE#2 during session establishment. The removed information is at least some and preferably all information which is not necessary for session establishment. Typically, the UE#2 of the callee 14 is located in NET#2 network which may be characterized as a lower capacity and therefore, slower packet switched communication network, access network, or service network. The CSCF 12 or PCSCF 15 performs extraction of the large payload information which would slow down the session establishment and causes the storage in a network entity 16 which may be a server or other storage including being within the CSCF 12 or PCSCF 15. After storage is complete, the INVITE message is transmitted to the UE#2 of the callee 14 without the extracted information and to which may be added the address of the storage 16. Thereafter, session establishment occurs as indicated by the dotted line. After session establishment is completed, the UE#2 of the callee 14 sends a 200 OK message in response to the INVITE message. Thereafter, the CSCF or PCSCF 12 sends an acknowledgement back to the UE#2 of the callee 14 which optionally may include the network address of the storage 16 at which the extracted information is stored. Thereafter, the information extracted from the original information large payload, which is stored in the storage 16, is transmitted to the UE#2 of the callee 14 as part of a SIP INFO message.

The transmission of the extracted information may be either in response to the receipt of the address from the UE#2 of the callee 14 of the storage 16 or the CSCF or PCSCF 12 determining a time, after session establishment is completed based upon the receipt of the 200 OK to the INVITE message being received, to send the extracted information by a SIP INFO message or otherwise. After receipt of the information by the user equipment #2 of the callee 14, a 200 OK message is sent back to the CSCF or PCSCF 12 that the extracted information has been received.

The foregoing session establishment mechanism provides the benefit of increasing the speed of session establishment especially with session establishment between UE#1 of caller 13 in the first higher speed packet switched communication network, such as NET#1 and UE#2 of callee 14 in a slower packet switched communication network such as NET#2 or other slower network.

Figure 2:
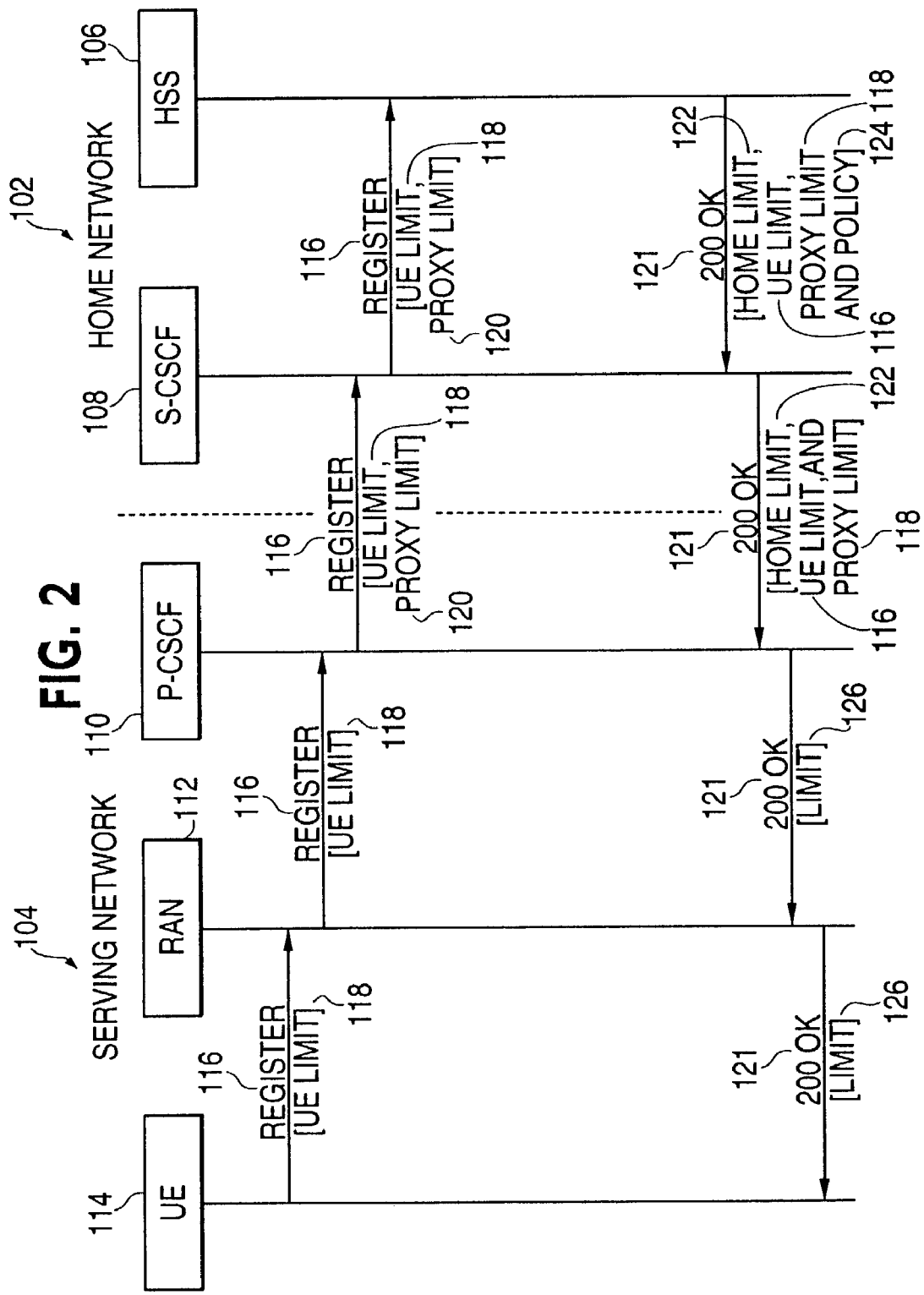
FIG. 2 illustrates a first method of determining a size limit used during establishing a session with callee user equipment located in a serving network in accordance with the invention.

FIG. 2 illustrates a first method by which a size limit is established for use in processing a request from caller user equipment 114 to establish a session in at least one communication network comprising home network 102 and serving network 104. The session will be established if the request to establish the session does not exceed a size limit as established by the process described in conjunction with FIG. 2. But if the size limit is exceeded, the request to establish the session will be rejected. The home network 102 contains HSS 106 and S-CSCF 108 and the serving network 104 contains P-CSCF 110, RAN 112 and callee user equipment 114. As illustrated, a request to register 116 is forwarded from user equipment 114 to RAN 112 which includes a user equipment limit 118 stored by the user equipment 114. The limit 118 specifies a size limit on signaling which the UE 114 may transmit or receive. The limit 118 may be determined by transmissions received from a base station transceiver (BTS not illustrated) which is part of a system parameters message or a subscription parameter. The RAN 112 passes on the registration message 116 and the user equipment limit 118 without adding its own size limitation to the P-CSCF 110. The P-CSCF 110 observes the UE limit 118 and adds any proxy limit size limitation 120 to the registration message 116 which are forwarded to the S-CSCF 108. As an alternative, the P-CSCF 110 may modify the UE limit 118 to be the lesser of the UE limit 118 and the proxy limit 120. If the UE limit 118 is derived from overhead signaling, then the proxy limit 120 should be the same as the UE limit 118. However, this permits any restrictions determined by the RAN 112 such as multiple vendor situations with a proxy serving multiple RANs of multiple vendors to be used. The S-CSCF 108 forwards the registration message 116, UE limit 118, and proxy limit 120 to the HSS 106. As an alternative, the S-CSCF 108 may modify the UE limit 118 at the proxy limit 120 to be the lesser of the UE limit or proxy limit. HSS 106 responds to the registration message from the S-CSCF with a home limit 122, UE limit 116, proxy limit 118 and policy 124. The home limit 122 is provided by the HSS 106 to indicate any conditions of the home network such as a network upgrade. The policy 124 is a set of rules for processing requests to establish a session by a session establishment entity by any one of the S-CSCF 108, P-CSCF 110, RAN 112 and UE 114 to signal if a request to establish a session does not meet size limitations. Any one of the session establishment entities 108, 110, 112 or 114 may perform the task of determining whether a request to establish a session with a UE 114 exceeds the size limit. However, it is desirable from the standpoint of radio airtime efficiency to make the determination before the RAN 112 so as to not involve the transmission of the request to register a session all the way to the UE 114 which utilizes the over-the-air resource in the situation where the request to establish a session could be denied as being too large. Both the S-CSCF 108 and P-CSCF 110 have the knowledge of the size limits which have been transmitted with the register message 116 such that the smallest size limit is preferably utilized by the S-CSCF 108 or P-CSCF 110. Alternatively, the size limit is used by the RAN 112 or the UE 114 but with the potential disadvantage of tying up the radio resource in a situation where a request for a session is denied. The policy 124 typically designates which of the S-CSCF 108, P-CSCF 110, RAN 112 or UE 114 is to perform the processing of a received request for registration as described below in order to determine if a request for registration will be accepted. With the SIP protocol, a SIP 200 OK message is transmitted to each successive potential session establishment entity S-CSCF 108, P-CSCF 110, RAN 112 or UE 114. The S-CSCF forwards the limit 126 to the RAN 112 which is forwarded to the UE 114. The limit 126 is the smallest size of the UE limit 116, proxy limit 118 and home limit 122 so as to inform the UE 114 of the size limitations involving both the reception of a request to establish a session with the UE 114 and to also originate a request to establish a session from the UE 114 to another UE (not illustrated).

Figure 3:
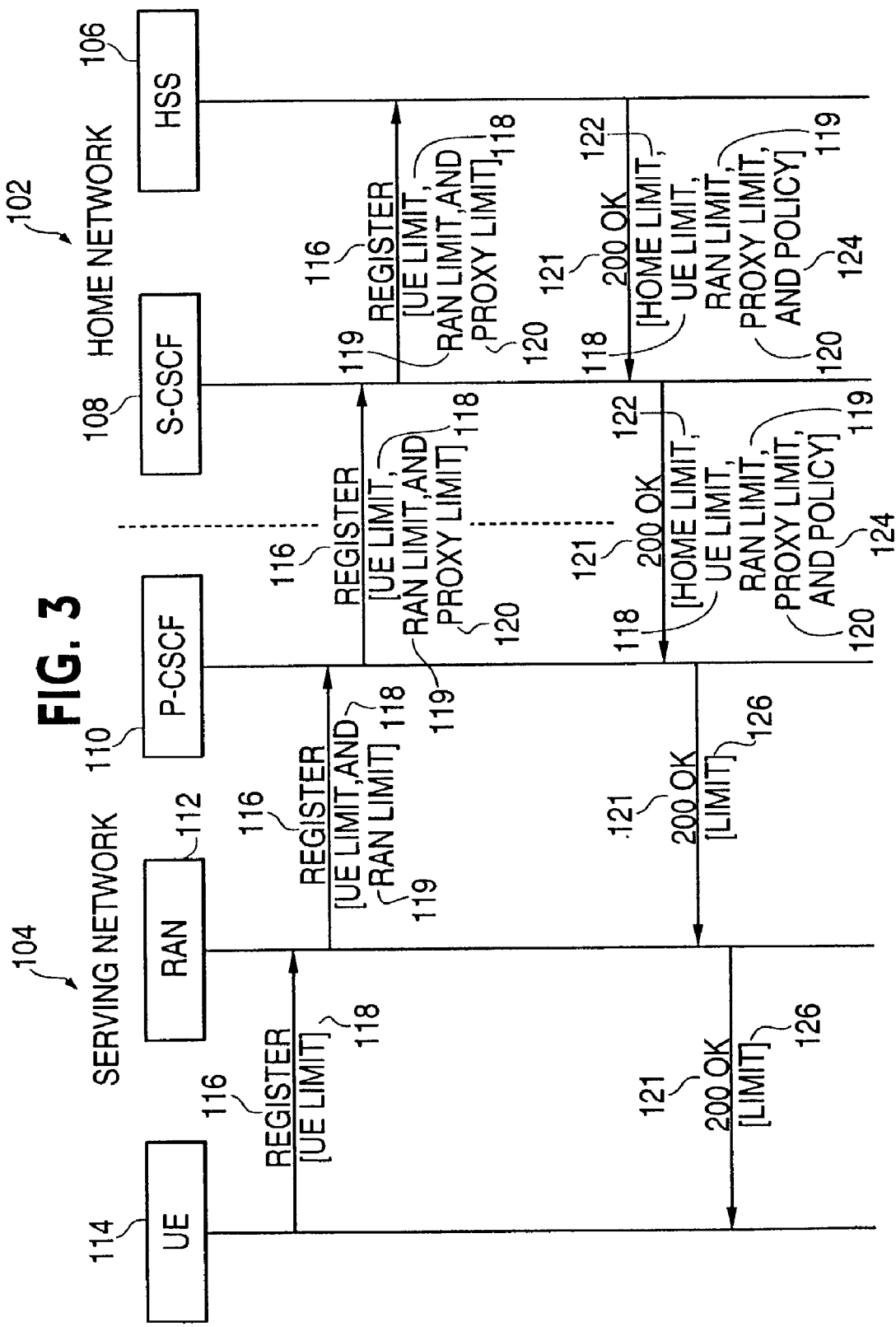
FIG. 3 illustrates a second method of determining a size limit used during establishing a session with callee user equipment located in a serving network in accordance with the invention.

FIG. 3 illustrates a second method of determining a size limit used during establishing a session with callee user equipment located in a serving network 104 which is similar to the method of FIG. 2. The difference is that the RAN 112 imposes a RAN limit which is transmitted in association with the registration message 116 from the RAN successively through the P-CSCF 110, S-CSCF 108 to the HSS 106 and back from the HSS to the S-CSCF and the PCSCF as illustrated. The function of the method of determining the size limit of FIG. 3 is identical that of FIG. 2 with the exception that the additional session established entity of the RAN 112 is part of the process.

FIG. 4 illustrates a third method of determining a size limit used during establishing a session with callee user equipment located in a home network 102. The method of FIG. 4 is similar to that of FIGS. 2 and 3 except that the process is contained within home network 102. As illustrated, registration request 116 is transmitted from the UE 114 through P-CSCF 110, S-CSCF 108 to HSS 106 along with limits added by each of the above-referenced session establishment entities. A transmission from the HSS 106 indicating acceptance as a 200 OK message along with the home limit 122, UE limit 118, proxy limit 120 and policy 124 as described above is sent back successively through the S-CSCF, P-CSCF and UE.

FIG. 5 illustrates a fourth method of determining a size limit used during establishing a session with callee user equipment located in home network 102. The fourth method differs from the third method of FIG. 4 by including the RAN 112 as one of the session establishment entities. The registration message 116 along with size limits imposed by each of the session establishment entities is transmitted to the HSS 106. In response the HSS 106 transmits an acknowledgement including the home limit 122, UE limit 118, RAN limit 119, proxy limit 120 and policy 124 in a manner analogous to that of FIG. 4.

The method of FIGS. 2–5 illustrate the diverse network architectures, and the use of diverse session establishment entities in accordance with the invention which may be used to determine the smallest size limit imposed by any session establishment entity for determining if requests for establishing a session are a size exceeding the size limit. Requests which are too large are rejected and requests not exceeding the size limit are accepted.

Figure 6C:
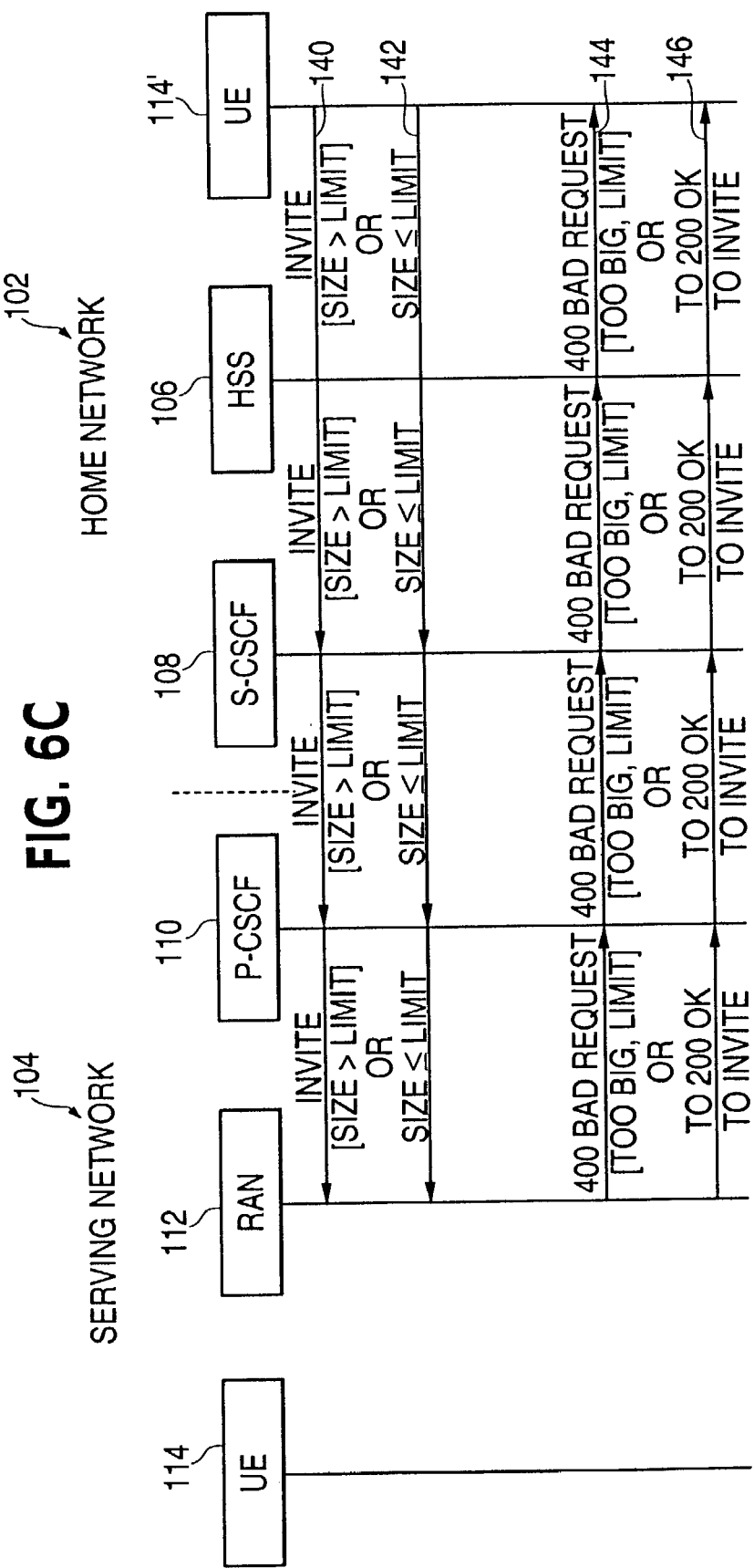
Figure 6D:
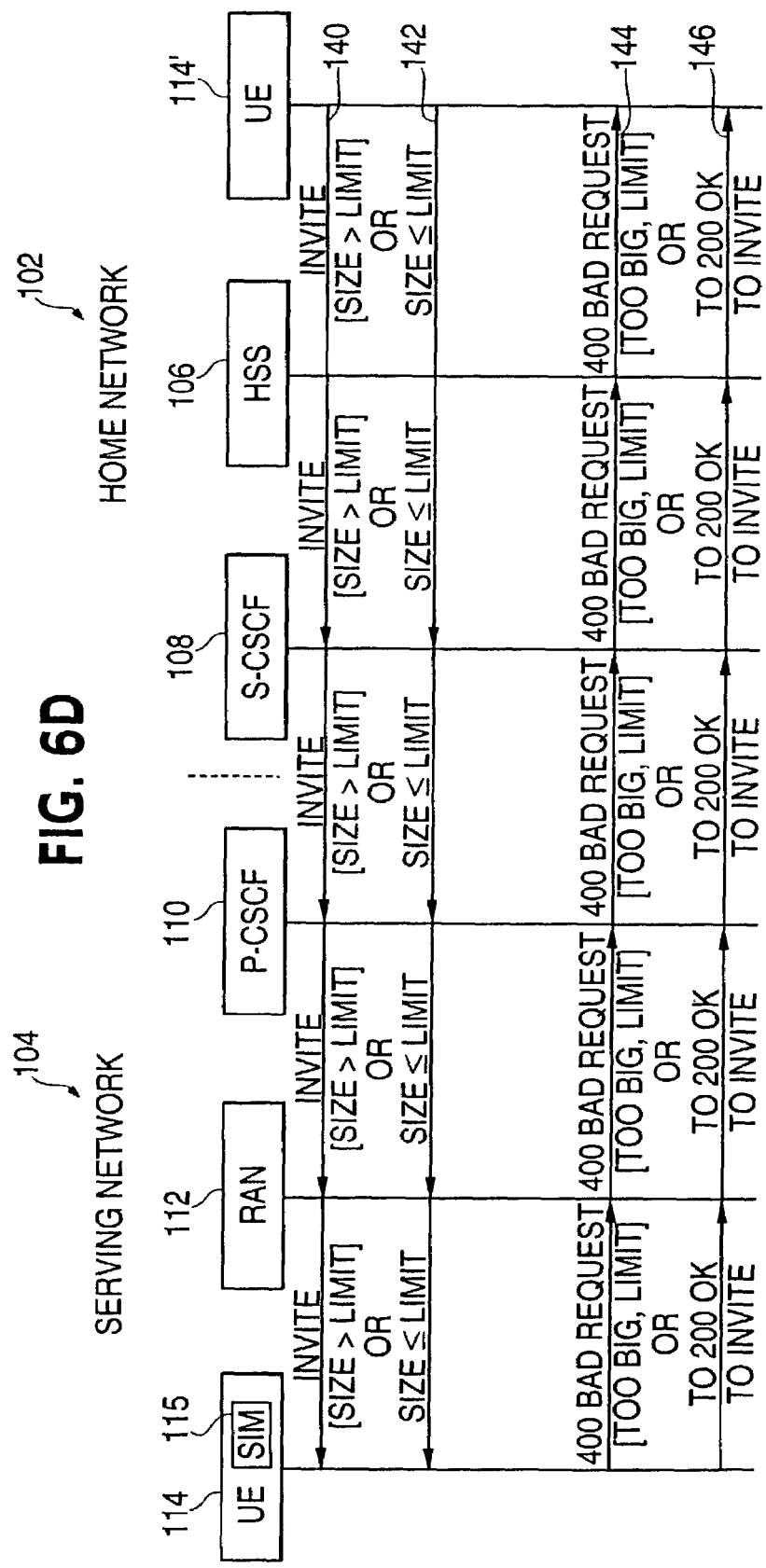
Figure 7B:
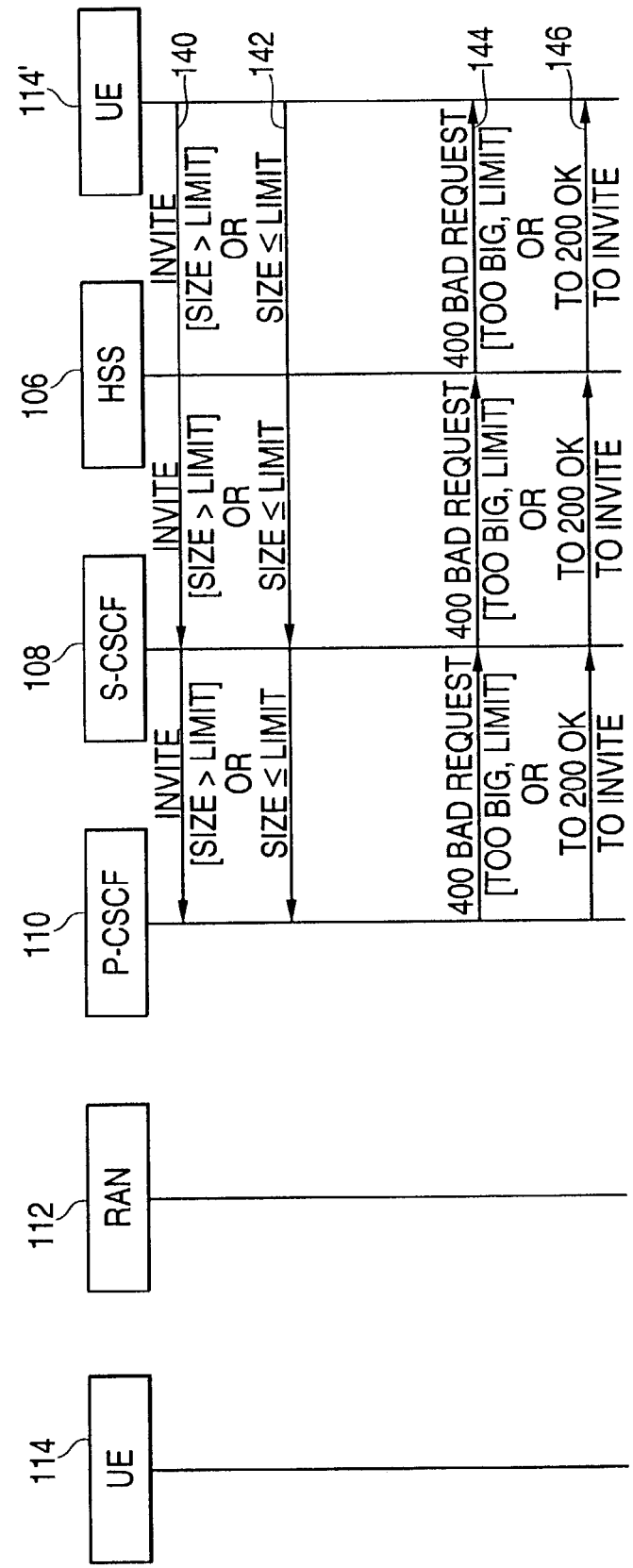
Figure 7C:
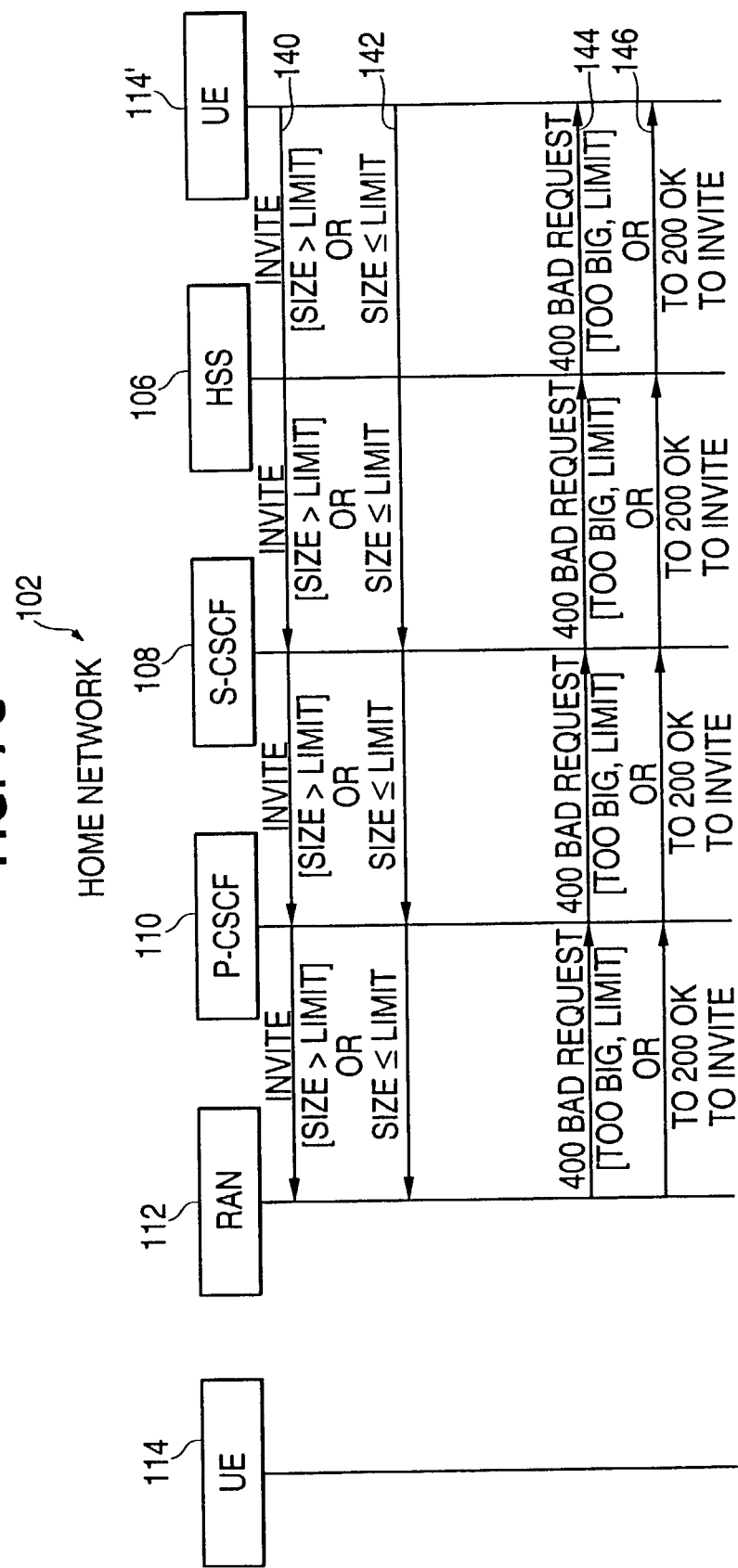
Figure 7D:
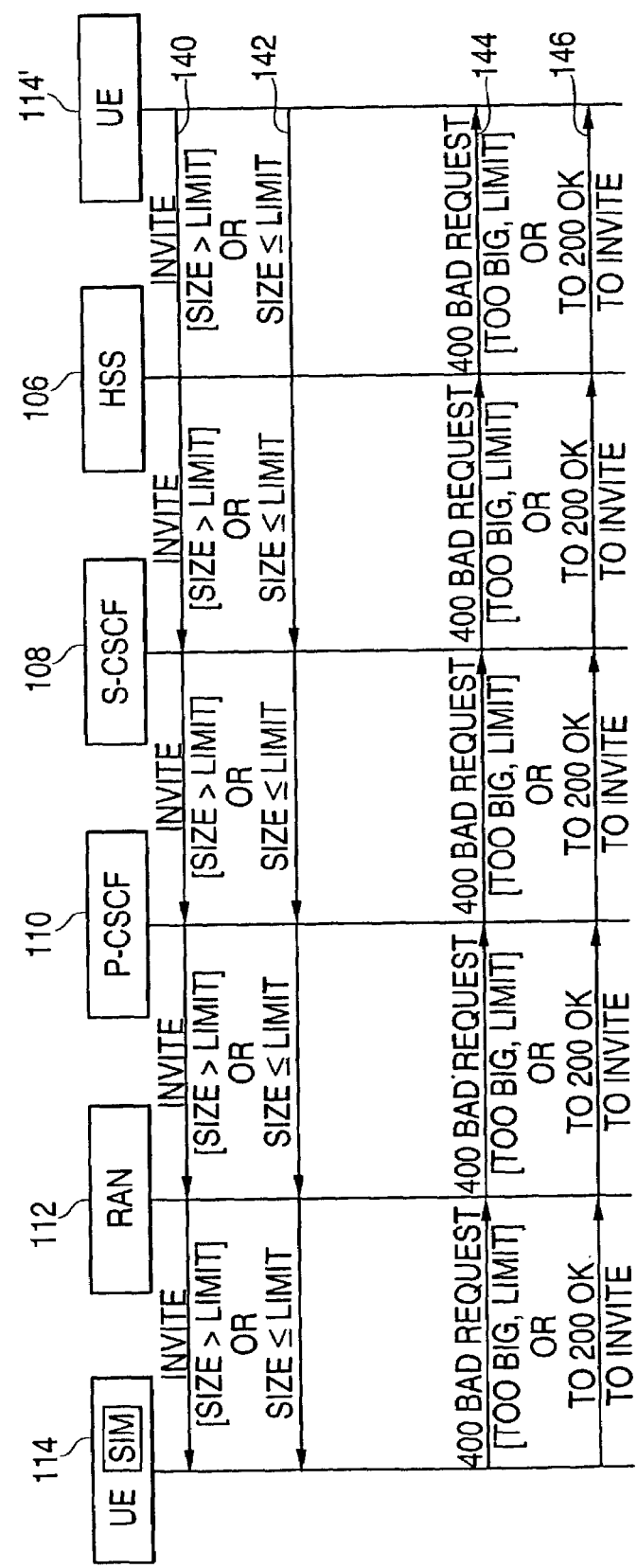

FIGS. 6A–6D illustrate the processing of a request for establishing a session from caller user equipment 114' to callee user equipment 114. In each of FIGS. 6A–6D two possible processings of a request for a session occur which are that a request 140 for a session has a size exceeding the limit determined by the processes of FIGS. 2 and 3 or a request for a session 142 which has a size equal to or less than the size limit as determined by the processes of FIGS. 2 and 3. All of the messages in FIGS. 6A–6D are depicted in the SIP protocol but it should be understood that the present invention is not limited thereto. Additionally, as illustrated in FIGS. 6A–6D, different session establishment entities which may be any one of the S-CSCF 108, P-CSCF 110, RAN 112 and UE 114 (or other entities which are not illustrated) process the requests 140 and 142 and provide a response 144 if the size limit is exceeded as exemplified by request 140 and provide a response 146 if the request 142 does not exceed the size limit. It may be seen by comparison of FIGS. 6A–6D that the request to establish a session terminates at a different session establishment entity which is assigned the task of determining if a request to establish a session with the callee user equipment 114 exceeds the size limit. In FIG. 6A, the S-CSCF 108 performs the size analysis; in FIG. 6B the P-CSCF 110 performs the size analysis; in FIG. 6C the RAN 112 performs the size analysis and in FIG. 6D the UE 114 provides the size analysis. Additionally, in FIG. 6D a subscriber identity module (SIM) 115 may be used to determine the size limit 116 of FIGS. 2–5 at the UE in addition to the methodology described above with respect to FIGS. 2 and 3. Moreover, in FIGS. 6A–6D, the responses 144 and 146 are issued from the session establishment entity performing the task of the size comparison. From FIGS. 6A–6D it is seen that the location of the session establishment entity in accordance with the present invention, which determines if a request to establish a session exceeds the size limit, may be located in different locations in multiple networks at session establishment entities such as without limitation home network 102 and the serving network 104.

FIGS. 7A–7D illustrate processing of a request to establish a session by different session establishment entities with callee user equipment in home network 102. The difference between FIGS. 7A–7D is that the processing to determine if the request to establish a session is larger than the size limit occurs in different session establishment entities. The S-CSCF 108 performs the size analysis in FIG. 7A; the P-CSCF 110 performs the size analysis in FIG. 7B; the RAN 112 performs the size analysis in FIG. 7C and the UE 114 performs the size analysis in FIG. 7D. Like FIGS. 6A–6D, in FIGS. 7A–7D, while the requests 140 and 142 and the responses 144 and 146 are described using the SIP protocol, it should be understood that the invention is not limited thereto.

It should be noted that the processing of a request to establish a session by RAN 112 or the UE 114 is less desirable than performing the same processing by the S-CSCF 108 and the P-CSCF 110 or any other network entity not in the radio network. It is desirable to eliminate a request to establish a session which is too large before transmission by the radio network which would be wasteful of the air-time resource.

FIG. 8 illustrates processing in accordance with the present invention in a packet data network 200 containing user equipment 114, RAN 112 comprising a radio network controller RNC and a BTS, serving general packet radio service (GPRS) support node SGSN 202 and Gateway GPRS support node GGSN 204 which determine a size limit of a request to originate a session. The size limit is used in deciding whether the UE 114 should originate a request for a session. The determination of the size limit is performed during registration with the packet data network 200. As illustrated, at step 1 the user equipment 114 activates a packet data protocol (PDP) context which is transmitted to RAN 112 and from the RAN to the SGSN 202. The SGSN 202 and the RAN 112 exchange radio access bearer (RAB) messages which are used by the SGSN to inform the RAN of standard SIP messages and any additional information which should be either rejected or sent via a bearer PBP context. At step 3, upon successful RAB setup indicated by step 2, SGSN 202 sends a create PBP context request message to the GGSN 204. The GGSN 204 sends a create PBP context response to the SGSN 202 after successfully creating the PBP context. PBP context is described in detail in the 3GPP specifications and is not described herein in detail. At step 5 an activate PBP context acceptance message is sent from the SGSN 202 to the UE 114 which informs the UE that PBP context has been created. The PDP content may include the size limit as discussed above to be used in origination of requests for a session emanating from the UE 114. The illustrated UE 114 may issue a request to establish a session 206 which is directed to another user equipment (not illustrated but may be the callee UE of the previous figures of drawings). The request is equal to or less than the size limit established at step 5.

FIG. 9 illustrates another processing in accordance with the present invention in which UE 114 obtains a size limit to be used in the same manner as FIG. 8. The size limit is in system information from a universal terrestrial radio access network UTRAN 300. As illustrated, the UE 114 uses the size limit to request the establishment of a session 302 with other user equipment (not illustrated) so long as the size of the request to establish the session is equal to or less than the size limit.

While the invention has been described in terms of its preferred embodiments, it should be understood that numerous modifications may be made thereto without departing from the spirit and scope of the present invention. It is intended that all such modifications fall within the scope of the appended claims.

The invention claimed is:

1. A method of determining in at least one communication network if a session should be established, comprising:
    processing a request from caller user equipment to establish a session with callee user equipment in the at least one communication network with a session establishment entity to determine if at least a portion of the request exceeds a size limit; and
    establishing the session if at least the portion of the request is determined by the session establishment entity to not exceed the size limit; and wherein
    when the request is determined to be beyond the size limit, at least a portion of the request is processed by the session establishment entity to remove from the at least a portion of the request information in the request beyond the size limit; and
    the information which is not removed is transmitted to the callee user equipment.

2. A method in accordance with claim 1 wherein:
    when the request is determined to be beyond the size limit, the session establishment entity rejects the request; and a message of the rejection is transmitted back to the caller user equipment.

3. A method in accordance with claim 2 wherein:
the at least one communication network comprises a home network; and
the callee user equipment is registered in the home network at a time the request to establish a session is received from the caller user equipment.

4. A method in accordance with claim 2 wherein:
the at least one communication network comprises a home network and a serving network; and
the callee user equipment is registered in the home network at a time the request to establish a session is received from the caller user equipment.

5. A method in accordance with claim 1 wherein:
the removed information is stored; and
the stored removed information is transmitted to the callee user equipment after completion of session establishment.

6. A method in accordance with claim 5 wherein:
the at least one communication network comprises a home network; and
the callee user equipment is registered in the home network at a time the request to establish a session is received from the caller user equipment.

7. A method in accordance with claim 5 wherein:
the at least one communication network comprises a home network and a serving network; and
the callee user equipment is registered in the home network at a time the request to establish a session is received from the caller user equipment.

8. A method in accordance with claim 5 wherein:
the removed information is stored at a server in the at least one communication network.

9. A method in accordance with claim 5 wherein:
the callee user equipment is in a serving network and the session establishment entity is in a home network with the serving network having a lower data transmission capacity than the home network.

10. A method in accordance with claim 1 wherein:
the size limit is determined by at least one of a home subscriber server, a call state control function entity, a radio access network and the callee user equipment.

11. A method in accordance with claim 10 wherein:
the call state control function entity is one of a proxy call state control function in a serving network and a serving call state control function in a home network.

12. A method in accordance with claim 11 wherein:
the session establishment entity which determines if at least a portion of the request exceeds the size limit is at least one of a home subscriber server, a call state control function entity and the callee user equipment which stores a smallest size limit.

13. A method in accordance with claim 12 wherein:
the callee user equipment is registered in the home network at a time the request is received from the caller user equipment.

14. A method in accordance with claim 11 wherein:
the at least one communication network comprises a home network and a serving network; and
the callee user equipment is registered in the home network at a time the request to establish a session is received from the caller user equipment.

15. A method in accordance with claim 10 wherein:
the session establishment entity which determines if at least a portion of the request exceeds the size limit is at least one of a home subscriber server, a call state control function entity and the callee user equipment which stores a smallest size limit.

16. A method in accordance with claim 15 wherein:
the at least one communication network comprises a home network; and
the callee user equipment is registered in the home network at a time the request to establish a session is received from the caller user equipment.

17. A method in accordance with claim 15 wherein:
the at least one communication network comprises a home network and a serving network; and
the callee user equipment is registered in the home network at a time the request to establish a session is received from the caller user equipment.

18. A method in accordance with claim 10 wherein:
the at least one communication network comprises a home network; and
the callee user equipment is registered in the home network at a time the request to establish a session is received from the caller user equipment.

19. A method in accordance with claim 10 wherein:
the at least one communication network comprises a home network and a serving network; and
the callee user equipment is registered in the home network at a time the request to establish a session is received from the caller user equipment.

20. A method in accordance with claim 1 wherein:
the at least one communication network comprises a home network; and
the callee user equipment is registered in the home network at a time the request to establish a session is received from the caller user equipment.

21. A method in accordance with claim 20 wherein:
the home network is a packet switched network.

22. A method in accordance with claim 1 wherein:
the at least one communication network comprises a home network and a serving network; and
the callee user equipment is registered in the home network at a time the request to establish a session is received from the caller user equipment.

23. A method in accordance with claim 1 wherein:
the processing of the request by the session establishment entity comprises filtering the request to determine if at least the portion of the request exceeds the size limit.

24. In at least one communication network containing a plurality of session establishment entities, a method for determining if a session should be established with caller user equipment requesting the session comprising:
registering callee user equipment with a home subscriber server in a home network by transmitting a request to register the callee user equipment containing at least one size limit to the home subscriber server, with each size limit being associated with a different session establishment entity in the at least one communication network;
determining a smallest size limit contained in the request to register;
processing a request to establish a session with a session establishment entity to determine if the request to establish the session exceeds the smallest size limit; and
establishing the session if the request is determined to not exceed the smallest size limit.

25. A method in accordance with claim 24 wherein:
when the request is determined to be beyond the smallest size limit, the session establishment entity rejects the request; and a message of the rejection is transmitted back to the caller user equipment.

26. A method in accordance with claim 25 wherein:
the smallest size limit is determined by at least one of a home subscriber server, a call state control function entity, a radio access network and the callee user equipment.

27. A method in accordance with claim 26 wherein:
the call state control function entity is one of a proxy call state control function in a serving network and a serving call state control function in a home network.

28. A method in accordance with claim 25 wherein:
the session establishment entity which determines if the request exceeds the smallest size limit is at least one of a home subscriber server, a call state control function entity and the callee user equipment which stores the smallest size limit.

29. A method in accordance with claim 24 wherein:
when the request is determined to be beyond the smallest size limit, at least a portion of the request is processed by the session establishment entity to remove from at least a portion of the request information in the request beyond the smallest size limit;
the removed information is stored; and
the stored removed information is transmitted to the callee user equipment after completion of session establishment.

30. A method in accordance with claim 29 wherein:
the smallest size limit is determined by at least one of a home subscriber server, a call state control function entity, a radio access network and the callee user equipment.

31. A method in accordance with claim 30 wherein:
the call state control function entity is one of a proxy call state control function in a serving network and a serving call state control function in a home network.

32. A method in accordance with claim 29 wherein:
the session establishment entity which determines if at least a portion of the request exceeds the size limit is at least one of a home subscriber server, a call state control function entity and the callee user equipment which stores the smallest size limit.

33. A method in accordance with claim 24 wherein:
the smallest size limit is determined by at least one of a home subscriber server, a call state control function entity, a radio access network and the callee user equipment.

34. A method in accordance with claim 33 wherein:
the call state control function entity is one of a proxy call state control function in a serving network and a serving call state control function in a home network.

35. A method in accordance with claim 24 wherein:
the session establishment entity which determines if the request exceeds the smallest size limit is at least one of a home subscriber server, a call state control function entity and the callee user equipment which stores the smallest size limit.

36. A method in accordance with claim 24 wherein:
the size limit is determined by at least one of a home subscriber server, a call state control function entity, a radio access network and the callee user equipment.

37. A method in accordance with claim 36 wherein:
the call state control function entity is one of a proxy call state control function in a serving network and a serving call state control function in a home network.

38. A method in accordance with claim 37 wherein:
the session establishment entity which determines if at least a portion of the request exceeds the size limit is at least one of a home subscriber server, a call state control function entity and the callee user equipment which stores the smallest size limit.

39. A method in accordance with claim 36 wherein:
the session establishment entity which determines if at least a portion of the request exceeds the size limit is at least one of a home subscriber server, a call state control function entity and the callee user equipment which stores the smallest size limit.

40. A method in accordance with claim 24 wherein:
the at least one communication network comprises a home network; and
the callee user equipment is registered in the home network at a time the request to establish a session is received from the caller user equipment.

41. A method in accordance with claim 24 wherein:
the at least one communication network comprises a home network and a serving network; and
the callee user equipment is registered in the home network at a time the request to establish a session is received from the caller user equipment.

42. In at least one communication network, a method for determining if a session should be established from caller user equipment comprising:
during registration of the caller user equipment with one of the at least one communication network the caller user equipment communicates with the at least one network to obtain a size limit of any request to establish a session by the caller user equipment;
the caller user equipment uses the size limit to determine if any request to establish a session to be provided by the caller user equipment does not exceed the size limit; and when the session does not exceed the size limit.

43. A method in accordance with claim 42 wherein:
the registration is with a packet data network.

44. A method in accordance with claim 42 wherein:
the registration is with a radio access network.

45. At least one network comprising:
caller user equipment;
callee user equipment;
a session establishment entity; and wherein
the at least one network processes a request from the caller equipment to establish a session with the callee user equipment in the at least one communication network with the session establishment entity to determine if at least a portion of the request exceeds a size limit and the session is established if at least a portion of the request is determined by the session establishment entity to not exceed the size limit and the caller user equipment requests establishment of a session when at least the portion of the request does not exceed the size limit, wherein
when the request is determined to be beyond the size limit, at least a portion of the request is processed by the session establishment entity to remove from the at least a portion of the request information in the request beyond the size limit; and
the information which is not removed is transmitted to the callee user equipment.

46. At least one network comprising:
a plurality of session establishment entities;
caller user equipment;
callee user equipment; and wherein callee user equipment is registered with a home subscriber server in a home network by transmitting a request to register the callee user equipment containing at least one size limit to the home subscriber server, with each size limit being associated with a different session establishment entity in the at least one communication network and a smallest size limit contained in the request is determined, a request to establish a session with a session establishment entity is processed to determine if the request to establish the session exceeds the smallest size limit, and the session is established if the request is determined to not exceed the smallest size limit.

47. At least one communication network comprising:

caller user equipment; and wherein during registration of the caller user equipment with one of the at least one communication network the caller user equipment communicates with the at least one network to obtain a size limit of any request to establish a session by the caller user equipment;

the caller user equipment uses the size limit to determine if any request to establish a session to be provided by the caller user equipment does not exceed the size limit; and the caller user equipment requests establishment of a session when the session requested does not exceed the size limit.

48. A method of determining in at least one communication network if a session should be established comprising:

processing a request from caller user equipment to establish a session with callee user equipment in the at least one communication network with a session establishment entity to determine if at least a portion of the request exceeds a size limit; and the caller user equipment requests establishing the session if at least the portion of the request is determined by the session establishment entity to not exceed the size limit; and wherein the size limit is determined by at least one of a home subscriber server, a call state control function entity, a radio access network and the callee user equipment, wherein when the request is determined to be beyond the size limit, at least a portion of the request is processed by the session establishment entity to remove from the at least a portion of the request information in the request beyond the size limit; and the information which is not removed is transmitted to the callee user equipment.

49. A method in accordance with claim 48 wherein:

the call state control function entity is one of a proxy call state control function in a serving network and a serving call state control function in a home network.

50. A method in accordance with claim 49 wherein:

the session establishment entity which determines if at least a portion of the request exceeds the size limit is at least one of a home subscriber server, a call state control function entity and the callee user equipment which stores a smallest size limit.

51. A method in accordance with claim 48 wherein:

the session establishment entity which determines if at least a portion of the request exceeds the size limit is at least one of a home subscriber server, a call state control function entity and the callee user equipment which stores a smallest size limit.

52. A method of determining in at least one communication network if a session should be established, comprising:

processing a request from caller user equipment to establish a session with callee user equipment in the at least one communication network with a session establishment entity to determine if at least a portion of the request exceeds a size limit; and establishing the session if at least the portion of the request is determined by the session establishment entity to not exceed the size limit; and wherein the at least one communication network comprises a home network; and the callee user equipment is registered in the home network at a time the request to establish a session is received from the caller user equipment, wherein when the request is determined to be beyond the size limit, at least a portion of the request is processed by the session establishment entity to remove from the at least a portion of the request information in the request beyond the size limit; and the information which is not removed is transmitted to the callee user equipment.

53. A method in accordance with claim 52 wherein:

the at least one network equipment comprises a serving network.

* * * * *

UNITED STATES PATENT AND TRADEMARK OFFICE
CERTIFICATE OF CORRECTION

| | | |
|---|---|---|
| PATENT NO. | : 7,035,213 B2 | |
| APPLICATION NO. | : 10/283236 | |
| DATED | : April 25, 2006 | |
| INVENTOR(S) | : Timothy L. Moran et al. | |

It is certified that error appears in the above-identified patent and that said Letters Patent is hereby corrected as shown below:

<u>Title page,</u>
Item [75], Inventor, should read -- Basavaraj Patil --.

Signed and Sealed this

Eleventh Day of July, 2006

JON W. DUDAS
*Director of the United States Patent and Trademark Office*